No. 701,953. Patented June 10, 1902.
H. SMITH.
FRICTION CLUTCH.
(Application filed Aug. 31, 1901.)
(No Model.)
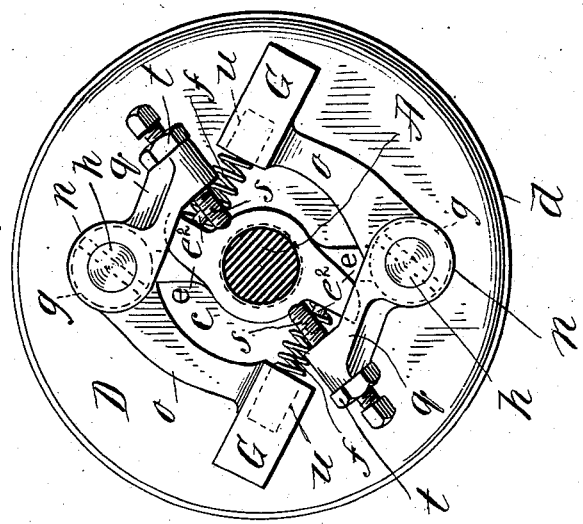
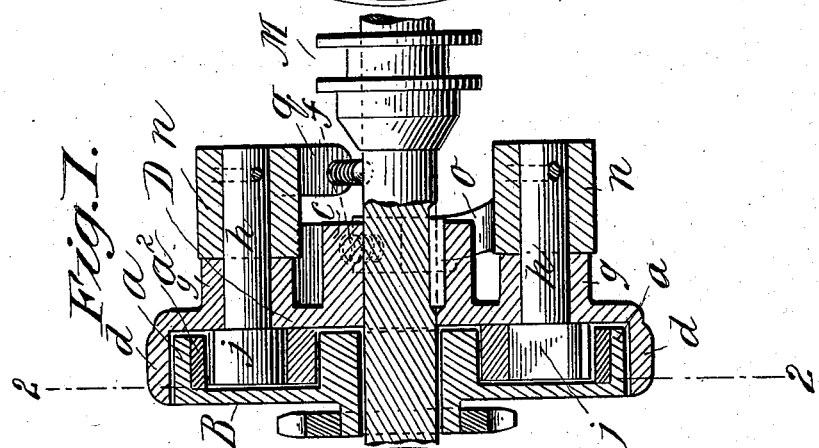
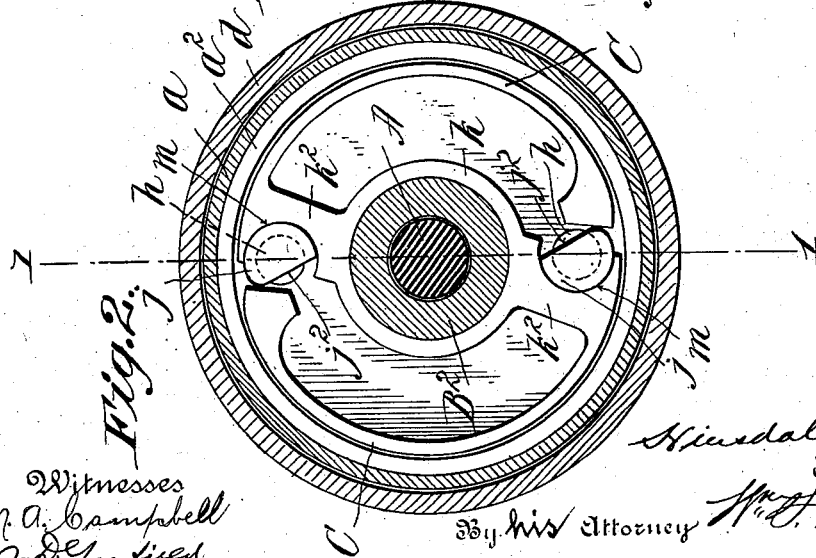
Hinsdale Smith,
Inventor

UNITED STATES PATENT OFFICE.

HINSDALE SMITH, OF SPRINGFIELD, MASSACHUSETTS.

FRICTION-CLUTCH.

SPECIFICATION forming part of Letters Patent No. 701,953, dated June 10, 1902.

Application filed August 31, 1901. Serial No. 73,937. (No model.)

*To all whom it may concern:*

Be it known that I, HINSDALE SMITH, a citizen of the United States of America, and a resident of Springfield, in the county of Hampden and State of Massachusetts, have invented certain new and useful Improvements in Friction-Clutches, of which the following is a full, clear, and exact description.

This invention relates to clutches, more particularly to centrifugal friction-clutches, and pertains to improved mechanism in a clutch of the class indicated actuated by the centrifugal arms or members and operating upon the clutch-shoes or engaging members, and to further devices in conjunction therewith operative to render the centrifugal members ineffective when so desired to cause the engagement of the shoes, which are mounted to turn in unison with the power-shaft with the disk or part to be clutched therewith and rotated thereby.

The invention consists in the constructions and combinations of parts, as hereinafter particularly set forth and described in conjunction with the accompanying drawings and pointed out in the claims.

In the drawings, Figure 1 is a central longitudinal sectional view through the clutch mechanism. Fig. 2 is a partial cross-sectional and otherwise a face view of the mechanism as seen to the right of the plane indicated by the line 2 2 on Fig. 1. On this Fig. 2 line 1 1 indicates the plane on which the longitudinal section, Fig. 1, is taken. Fig. 3 is a face view of the clutch as seen looking to the left, Fig. 1, from the line 3 3 thereon.

Similar characters of reference indicate corresponding parts in all of the views.

In the drawings, A represents the shaft, understood as being properly mounted for rotation. The power is applied through this shaft.

B represents a disk the hub of which is loosely mounted on a portion of the shaft, so that the latter may turn freely and independently of the disk. The said disk B is provided with the annular angularly-extended flange $a$, having affixed as one therein the lining $a^2$. The disk with its flange may be of cast-iron and the lining of brass, bronze, or other material to advantageously receive thereagainst the frictional bearing of the friction-shoes C C. To all intents and purposes the lining $a^2$ is integral with the flange $a$ and is to be regarded as a part of the flange.

D represents a support, shown as in the form of a disk, having a hub $c$, which is keyed or affixed to the shaft, and also having the flange-rim $d$, which loosely incloses the flange $a$ of the aforesaid disk B. The said hub $c$ of the support D is provided with the oppositely-extended projections $e$, forming abutments for the springs $f$. The support is, moreover, at diametrically opposite points provided with the journal-hubs $g\ g$, through which are mounted the spindles $h\ h$, which at their ends within the separated portions of the friction-shoes are provided with the cams $j\ j$.

The double friction-shoes, as shown in Fig. 2, are integrally formed by a single appliance properly worked out in metal, comprising central ring $k$, radial tie members $k^2\ k^2$, and the flexible arc-shaped friction-shoes proper, C, the free ends of each being squared and terminating adjacent the tie member, one side of which latter is formed with a partial cylindrical socket $m$ to form a bearing-back for the rounded side of the cam, the opposite side of which, as shown at $j^2$, is flattened or slabbed to exert when the cam is turned a crowding and distending action against the flexible shoe members.

Pinned or otherwise affixed to the ends of the spindles opposite the cams are the intermediate hubs $n\ n$ of double-armed levers, the arms $o\ o$ carrying at their extremities the weight-enlargements G, while the opposite arms $q\ q$ of the levers have the screw-studs $s$ extended through them adjustably, being provided with the check-nuts $t\ t$, said screw-studs standing substantially radial to the power-shaft and having their inner extremities quite near to the latter and to the sliding cone-ended sleeve M, which normally, as shown in Fig. 1, is slid out of position of engagement or restraint on the extremities of the screws $s$ of the lever-arms. The end weights G are socketed, as indicated at $u$, at their inner ends, into which are set the end portions of the spiral springs $f$, the opposite ends of which are seated over studs $e^2$ of the aforementioned projections from the hub of the support D. The springs $f\ f$ prevent, particularly at the time the mechanism is being started, the threshing of the centrifugal members G G.

In operation with the cone-ended sleeve moved endwise away from the restraining-arms $q$, connected with the centrifugal arms $o$ G, and speed given to the power-shaft A and therewith the supports D, the centrifugal members by reason of their outwardly-swinging movements impart rotational movements to the spindles $h$ and their cams $j$, resulting in the setting of the clutch and the causing of the disk or driven part B to move in unison with the shaft or driving part A.

I am of course aware that clutches operative for the engagement between the driving and driven parts have been devised which are dependent on the action of centrifugal weight arms or levers in turn acting to crowd friction-shoes. I am also aware that it is very common to provide cone-ended sleeves in clutches, but for a diametrically opposite purpose from that conceived of by me. The clutch herein described is not to be understood as an automatic clutch and dependent for its application on the speed of the driving part; but it is a clutch having its engagement parts actuated by centrifugal members during the running of the driven part as permitted by and at the will of the operator, (and upon the freeing of the restraining extension-arms $q$, so that the centrifugal effects may take place,) and this clutch mechanism is unlike certain other known clutch mechanisms which are entirely dependent for action on the centrifugal members thereof and in which the application of the clutch is dependent on the running speed of the driving part, for the present clutch is entirely independent for its application on the running speed of the driving part and is available at all suitable speeds during the running of the driving part, according to the will of the operator, whether the power developed by or corresponding to the running speed is more or less.

Having thus described my invention, what I claim, and desire to secure by Letters Patent, is—

1. In a clutch of the character described, the combination with the power-shaft, of the disk free relatively thereto, having the annular flange, the support carried by the shaft, the distensible friction-shoes located within the disk-flange and connected to the support for movement in unison therewith, the spindles having rocking motions on the support and provided with the cams operating on the friction-shoes, and the centrifugal weight-arms affixed to the spindles.

2. In a clutch of the character described, the combination with the power-shaft, of the disk free relatively thereto, having the annular flange, the support carried by the shaft, the distensible friction-shoes located within the disk-flange and connected to the support for movement in unison therewith, the spindles having rocking motions on the support and provided with the cams operating on the friction-shoes, the double arms fixed to each spindle, one being a centrifugally-acting member, and the other a member to restrain such action, and a device movable into and from engagements with the restraining-arms, for the purposes set forth.

3. In a clutch, the combination with the power-shaft, having the carrier or support D affixed thereon, and which is provided with the journal-hubs $g$ $g$ of the disk to be driven mounted loosely relatively to the shaft and having the edge flange, the friction-shoes C C, comprised as flexible arc-shaped members of, and integral with, uniting members $k^2$ and a central ring $k$ located within the flange-disk, the ends of each shoe being located adjacent, but separated from, the uniting member $k^2$, the spindles $h$ passed through the journal-hubs of the support, and each provided with the cam $j$ at one end, and at the other with a centrifugal arm, substantially as described.

4. In a clutch, the combination with the power-shaft, having the carrier or support D affixed thereon, and which is provided with the journal-hubs $g$ $g$, of the disk to be driven mounted loosely relatively to the shaft and having the edge flange, the friction-shoes C C, comprised as flexible arc-shaped members of, and integral with, uniting members $k^2$ and a central ring $k$ located within the flange-disk, the ends of each shoe being located adjacent, but separated from, the uniting member $k^2$, and the uniting members having the partially-cylindrical cam-seats $m$, the spindles $h$ passed through the journal-hubs of the support, and each provided with the cam $j$ resting in said seat, at one end, and at the other end provided with a centrifugal arm, substantially as described.

5. In a clutch, the combination with the power-shaft, of the disk, free relatively thereto, having the annular flange, the support carried by the shaft, the distensible friction-shoes located within the disk-flange, the spindles having rocking motions on the support and provided with the cams operating on the friction-shoes, the double arms fixed to each spindle, one being a centrifugally-acting member, and the other a member to restrain such action, provided with an adjustable contact-screw $s$, and a device movable into, and from, engagements with the said contact-screws, for the purposes set forth.

6. In a clutch of the character described, the combination with the power-shaft, of the disk free relatively thereto, having the annular flange, the support carried by the shaft, having the hub thereof provided with the opposite projections $e$ $e$, the distensible friction-shoes located within the disk-flange, the spindles having rocking motions on the support and provided with the cams operating on the friction-shoes, and also with the centrifugal weight-arms affixed to the spindles, and the spring interposed between the said arms and said projections $e$.

7. In a clutch, the combination with the power-shaft, carrying the support D, of the disk to be driven loosely mounted on the shaft provided with the concentric hub $B^2$ and the rim-flange $a$, the shoe appliance consisting of the concentric ring $k$, the radial tie members $k^2 k^2$, and the arc-shaped shoe members C C integral with the tie members, and extending from their connections with the one into proximity to the other, as shown, the one side of each tie member having a partial cylindrical cam-seat, the spindles having rocking motions in the support, and provided each at one end with the cam having its partially-cylindrical portion fitted in said cam-seat, and having the non-circular portion thereof in engagement with the free end of the friction-shoe, and each spindle having at its other end the centrifugal arm $o$ and the oppositely-extended arm $q$, and the sliding cone-sleeve arranged to engage and disengage the arms $q$, for the purposes set forth.

8. In a clutch, the combination with the driving-shaft, and a part free therefrom to be driven thereby, of a support mounted on the driving part provided with centrifugal members, friction-shoes, coacting with the parts to be driven, arranged to be operated on by said centrifugal members, and said centrifugal members having restraining-arms, extended into approached relations to the driving-shaft and the cone-sleeve arranged to slide on the shaft to disengage, and to engage, said restraining-arms, for the purpose set forth.

9. In a clutch, the combination with the power-shaft, of the disk, free relatively thereto, having the annular flange, the support carried by the shaft, the distensible friction-shoes located within the disk-flange, the spindles having rocking motions on the support and provided with the cams operating on the friction-shoes, the double arms fixed to each spindle, one being a centrifugally-acting member, and the other a member to restrain such action, and a device movable into, and from, engagements with the said restraining-arms, for the purposes set forth.

Signed by me at Springfield, Massachusetts, this 17th day of August, 1901.

HINSDALE SMITH.

Witnesses:
WM. S. BELLOWS,
M. A. CAMPBELL.